United States Patent Office 3,508,937
Patented Apr. 28, 1970

3,508,937
FLUOROPHOSPHATE GLASS
Heinz Bromer, Hermannstein, and Norbert Meinert, Wetzlar, Germany, assignors to Ernst Leitz G.m.b.H., Optische Werke, Wetzlar, Germany
No Drawing. Filed June 12, 1967, Ser. No. 645,535
Claims priority, application Germany, June 25, 1966, L 53,924
Int. Cl. C03c 3/18
U.S. Cl. 106—47    21 Claims

ABSTRACT OF THE DISCLOSURE

Fluorophosphate glass, characterized in that it is produced by melting from a mixture consisting of: 9–12 mol percent of the metaphosphates of the elements selected from the group consisting of lithium, sodium, potassium, magnesium, and aluminum; 81–90 mol percent of fluorides of the elements selected from the group consisting of magnesium, calcium, strontium, barium and aluminum; 0.4–7 mol percent of at least one of the compounds selected from the group consisting of potassium arsenate, potassium fluorotitanate, potassium fluorozirconate, and potassium fluorotantalate; and with the proviso that a proportion of aluminum metaphosphate is always present to at least one-half of the phosphate proportion; and the calcium fluoride is always present at about one-half (+ or −10%) and the aluminum fluoride is always present at about one quarter of the proportion of fluorides.

BACKGROUND OF THE INVENTION

This invention relates to a new type of glass. More particularly it relates to a new fluorophosphate type of glass. And still more particularly it relates to a new fluorophosphate glass having a refractive index of about 1.47 to about 1.53 and having dispersion values of about 75 to about 85.

Fluorophosphate glasses are of particular interest because of their anomalous partial dispersion since such dispersion enables the secondary spectrum to be corrected in calculating the optical values.

Heretofore the natural raw materials for making the fluorophosphate type glasses have been used as crystals. The disadvantages exhibited by these crystals are that they are either difficult to work with because of their brittleness, as in fluorspar, for example; or, they are extraordinarily sensitive to atmospheric influences, as alum, for example. Because of these disadvantages of the natural raw materials for any particular controlled use, attempts have been made for many years to develop glasses having approximately similar optical values.

DESCRIPTION OF THE PRIOR ART

Glasses having a high content of fluorine are known. Such glasses are particularly suitable for meeting the requirements of the optician. However, these glasses are hard to melt when in large pieces because of the volatility of the fluorine. Particularly disadvantageous in this connection is the occurrence of schlieren in the glass. Also, since the provision of the desired optical values is made difficult for the same reasons, it is necessary to calculate the objectives wherein these glasses are employed so that they are adjusted to the individual melts.

SUMMARY OF THE INVENTION

The objects of the invention are: To develop new and novel glasses; to develop new and novel fluorophosphate glasses; to develop new and novel fluorophosphate glasses that overcome the shortcomings of the prior art glasses; and to develop new and novel fluorophosphate glasses from large pieces of such glasses with concomitant good reproducibility of the optical values.

Other objects and many of the attendant advantages of the present invention will become apparent to those skilled in the art from the following specification taken in conjunction with the various tables recited in the examples and in the claims.

DESCRIPTION OF THE PREFERRED EMBODIMENTS

According to the invention, it has now been discovered that it is possible to produce by melting, large pieces of fluorophosphate glasses, with concomitant good reproducibility of the optical values, when mixtures are used which consist of the following components:

(a) 9–12 mol percent of metaphosphates of the elements selected from the group consisting of lithium, sodium, potassium, magnesium, and aluminum;

(b) 81–90 mol percent of fluorides of the elements selected from the group consisting of magnesium, calcium, strontium, barium, and aluminum; and (c) 0.4–7 mol percent of at least one of the compounds selected from the group consisting of potassium arsenate, potassium fluorotitanate, potassium fluorozirconate and potassium fluorotantalate.

With the proviso that the proportion of aluminum metaphosphate is to be at least one-half of the phosphates, the proportion of calcium fluoride is to be 45–52% of the fluorides, and the porportion of aluminum fluoride is to be approximately one-fourth of the total proportion of the fluorides.

Glasses produced by melting from the mixtures having the above composition exhibit an aberration of the $\nu$-value from the curve of the normal glasses in the $\nu$-(−)-diagram of up to 23 units. Consequently they are endowed with properties which make them particularly suitable for use in apochromatic objectives. Moreover, the use of these glasses is not limited to micro-objectives any more as the size of the pieces of raw glass of flawless character producible by melting is sufficient for producing lenses for photo- and telescope objectives.

EXAMPLES

Examples of the mixture compositions are set forth in the following tables:

Table 1 contains the mixture compositions according to the invention in mol percent in view of the fact that mixtures of chemical substances are involved and chemical reactions take place in the melts.

Table 2, only for comparison, the same compositions are set forth in percent by weight.

TABLE 1 IN MOLE PERCENT

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $LiPO_3$ | 3.0 | 3.1 | 3.0 | 3.0 | 3.1 | 3.1 | 3.1 | 3.1 | | | | | | |
| $NaPO_3$ | | | | | | | | | 2.5 | 2.5 | 2.5 | 2.5 | 2.6 | 2.5 |
| $Mg(PO_3)_2$ | 1.7 | 1.7 | 1.7 | 1.7 | 1.7 | 1.7 | 1.7 | 1.7 | 1.7 | 1.7 | 1.7 | 1.7 | 1.6 | 1.6 |
| $Al(PO_3)_3$ | 5.5 | 5.7 | 5.5 | 5.5 | 5.6 | 5.6 | 5.7 | 5.7 | 5.5 | 5.5 | 5.4 | 5.4 | 5.3 | 5.3 |
| $MgF_2$ | 10.1 | 10.3 | 10.0 | 10.1 | 10.2 | 10.2 | 10.4 | 10.4 | 10.0 | 9.9 | 9.9 | 9.9 | 9.8 | 9.7 |
| $CaF_2$ | 41.6 | 42.5 | 41.2 | 41.6 | 41.9 | 42.0 | 42.8 | 42.7 | 41.2 | 41.0 | 40.8 | 40.6 | 40.0 | 39.7 |
| $SrF_2$ | 4.4 | | 4.3 | | 3.4 | | | | 7.6 | 7.6 | 7.5 | 7.4 | 7.5 | 7.3 |
| $BaF_2$ | 9.3 | 9.5 | 9.2 | 9.3 | 9.4 | 9.4 | 9.6 | 7.1 | 9.2 | 9.1 | 9.1 | 9.0 | 8.9 | 8.8 |
| $AlF_3$ | 22.2 | 22.6 | 21.9 | 22.2 | 22.3 | 22.3 | 22.8 | 22.7 | 21.9 | 21.9 | 21.7 | 21.4 | 21.3 | 21.3 |
| $KAsO_3$ | | | 3.2 | 6.6 | | | | 2.7 | | | | | | |
| $K_2TiF_6$ | 2.2 | 4.6 | | | | | | | 0.4 | 0.8 | 1.4 | 2.1 | 3.0 | 3.8 |
| $K_2ZrF_6$ | | | | | | 2.3 | 3.9 | 3.9 | | | | | | |
| $K_2TaF_7$ | | | | | 1.4 | | | | | | | | | |
| $n_e$ | 1.4832 | 1.4804 | 1.4875 | 1.4963 | 1.5296 | 1.4881 | 1.4869 | 1.4922 | 1.4782 | 1.4786 | 1.4787 | 1.4843 | 1.4826 | 1.4840 |
| $v_e$ | 80.5 | 77.3 | 80.8 | 78.3 | 83.0 | 79.9 | 78.2 | 77.3 | 82.6 | 81.8 | 81.1 | 79.1 | 75.5 | 75.4 |
| $\theta'$ | 4,833 | 4,791 | 4,677 | 4,748 | 4,765 | 4,681 | 4,703 | 4,772 | 4,698 | 4,752 | 4,847 | 4,771 | 4,820 | 4,813 |
| $\Delta v_e$ | +20.7 | +14.1 | +8.2 | +11.7 | +17.8 | +7.7 | +7.8 | +12.7 | +11.8 | +15.5 | +22.4 | +14.4 | +14.9 | +14.0 |

TABLE 2 IN WEIGHT PERCENT

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $LiPO_3$ | 2.5 | 2.5 | 2.5 | 2.5 | 2.4 | 2.5 | 2.5 | 2.5 | | | | | | |
| $NaPO_3$ | | | | | | | | | 2.5 | 2.5 | 2.5 | 2.4 | 2.4 | 2.3 |
| $Mg(PO_3)_2$ | 3.0 | 3.0 | 3.0 | 3.0 | 3.0 | 3.0 | 3.0 | 3.0 | 3.0 | 3.0 | 2.9 | 2.9 | 2.8 | 2.8 |
| $Al(PO_3)_3$ | 14.0 | 14.0 | 14.0 | 14.0 | 14.0 | 14.0 | 14.0 | 14.0 | 14.0 | 13.9 | 13.7 | 13.5 | 13.2 | 12.9 |
| $MgF_2$ | 6.0 | 6.0 | 6.0 | 6.0 | 6.0 | 6.0 | 6.0 | 6.0 | 6.0 | 5.9 | 5.9 | 5.8 | 5.7 | 5.6 |
| $CaF_2$ | 31.0 | 31.0 | 31.0 | 31.0 | 31.0 | 31.0 | 31.0 | 31.0 | 31.0 | 30.7 | 30.4 | 29.8 | 29.2 | 28.7 |
| $SrF_2$ | 5.2 | | 5.2 | | 5.2 | 4.0 | | | 9.2 | 9.1 | 9.0 | 8.8 | 8.7 | 8.5 |
| $BaF_2$ | 15.5 | 15.5 | 15.5 | 15.5 | 15.5 | 15.5 | 15.5 | 15.5 | 15.5 | 15.3 | 15.2 | 14.9 | 14.6 | 14.4 |
| $AlF_3$ | 17.8 | 17.8 | 17.8 | 17.8 | 17.8 | 17.8 | 17.8 | 17.8 | 17.8 | 17.6 | 17.4 | 17.1 | 16.8 | 16.5 |
| $KAsO_3$ | | | 5.0 | 10.2 | | | | 4.0 | | | | | | |
| $K_2TiF_6$ | 5.0 | 10.2 | | | | | | | 1.0 | 2.0 | 3.0 | 4.8 | 6.6 | 8.3 |
| $K_2ZrF_6$ | | | | | | 6.2 | 10.2 | 10.2 | | | | | | |
| $K_2TaF_7$ | | | | | 5.0 | | | | | | | | | |
| $n_e$ | 1.4832 | 1.4804 | 1.4875 | 1.4963 | 1.5296 | 1.4881 | 1.4869 | 1.4922 | 1.4782 | 1.4786 | 1.4787 | 1.4843 | 1.4826 | 1.4840 |
| $v_e$ | 80.5 | 77.3 | 80.8 | 78.3 | 83.0 | 79.9 | 78.2 | 77.3 | 82.6 | 81.8 | 81.1 | 79.1 | 75.5 | 75.4 |
| $\vartheta'$ | 4,833 | 4,791 | 4,677 | 4,748 | 4,765 | 4,681 | 4,703 | 4,772 | 4,698 | 4,752 | 4,847 | 4,771 | 4,820 | 4,813 |
| $\Delta v_e$ | +20.7 | +14.1 | +8.2 | +11.7 | +17.8 | +7.7 | +7.8 | +12.7 | +11.8 | +15.5 | +22.4 | +14.4 | +14.9 | +14.0 |

The present specification describes operable examples of the invention for the purposes of a statutory disclosure. It is, however, intended to cover all changes, modifications and combinations of the embodiments shown, which do not depart from the spirit and scope of the invention as claimed.

The following melting procedure applies for glasses of this type:

Melt composition (in percent by weight)

| | |
|---|---|
| $Mg(PO_3)_2$ | 3.0 |
| $Al(PO_3)_3$ | 14.0 |
| $Li(PO_3)$ | 2.5 |
| $MgF_2$ | 6.0 |
| $CaF_2$ | 31.0 |
| $SrF_2$ | 9.2 |
| $BaF_2$ | 14.5 |
| $AlF_3$ | 17.8 |
| $K_2TiF_6$ | 2.0 |

The well mixed ingredients of the melt mixture of about 1 kg. are molten down in a platinum crucible at a furnace temperature of about 1000° C. The melt is then refined at a temperature of about 1200° C. for 5 minutes. Thereafter the melt is cooled to about 630° C. with constant stirring and then poured into carbon molds which have been preheated to about 440° C. After the glasses have been cast into the preheated molds they are annealed in the usual manner. The optical values of the glass are:

Refractive index $n_e$ = 1.4875
Dispersion value $v_e$ = 81.07
Transformation point: 415° C.
Softening point: 452° C.

What is claimed is:

1. Fluorophosphate glass, characterized in that it is produced by melting from a mixture consisting of:
 (a) 9–12 mol percent of the metaphosphates of the elements selected from the group consisting of lithium, sodium, potassium, magnesium, and aluminum;
 (b) 81–90 mol percent of fluorides of the elements selected from the group consisting of magnesium, calcium, strontium, barium and aluminum;
 (c) 0.4–7 mol percent of at least one of the compounds selected from the group consisting of potassium arsenate, potassium fluorotitanate, potassium fluorozirconate, and potassium fluorotantalate; and with the proviso that
 (d) a proportion of aluminum metaphosphate is always present to at least one-half of the phosphate proportion; and
 (e) the calcium fluoride is always present at about one-half (+ or −10%) and the aluminum fluoride is always present at about one quarter of the proportion of fluorides.

2. Fluorophosphate glass as in claim 1 wherein the compound in step (c) is potassium arsenate.

3. Fluorophosphate glass as in claim 1 wherein the compound in step (c) is potassium fluorotitanate.

4. Fluorophosphate glass as in claim 1 wherein the compound in step (c) is potassium fluorozirconate.

5. Fluorophosphate glass as in claim 1 wherein the compound in step (c) is potassium fluorotantalate.

6. Fluorophosphate glass as claimed in claim 1, the elements of said mixture being in mol percent about $LiPO_3$ 3.1; $Mg(PO_3)_2$ 1.7; $Al(PO_3)_3$ 5.7; $MgF_2$ 10.3; $CaF_2$ 42.5; $BaF_2$ 9.5; $AlF_3$ 22.6; $K_2TiF_6$ 4.6; $n_e$ 1.4804; $v_e$ 77.3; $\vartheta'$ 4791; $\Delta v_e$ +14.1.

7. Fluorophosphate glass as claimed in claim 1, the elements of said mixture being in mole percent about $LiPO_3$ 3.0; $Mg(PO_3)_2$ 1.7; $Al(PO_3)_3$ 5.5; $MgF_2$ 10.0; $CaF_2$ 41.2; $SrF_2$ 4.3; $BaF_2$ 9.2; $AlF_3$ 21.9; $KAsO_3$ 3.2; $n_e$ 1.4875; $v_e$ 80.8; $\vartheta'$ 4677; $\Delta v_e$ +8.2.

8. Fluorophosphate glass as claimed in claim 1, the elements of said mixture being in mol percent about $LiPO_3$ 3.1; $Mg(PO_3)_2$ 1.7; $Al(PO_3)_3$ 5.6; $MgF_2$ 10.2; $CaF_2$ 41.9; $SrF_2$ 4.4; $BaF_2$ 9.4; $AlF_3$ 22.3; $K_2TaF_7$ 1.4; $n_e$ 1.5296; $v_e$ 83.0; $\vartheta'$ 4765; $\Delta v_e$ +17.8.

9. Fluorophosphate glass as claimed in claim 1, the elements of said mixture being in mol percent about $LiPO_3$ 3.1; $Mg(PO_3)_2$ 1.7; $Al(PO_3)_3$ 5.7; $MgF_2$ 10.4; $CaF_2$ 42.8; $BaF_2$ 9.6; $AlF_3$ 22.8; $K_2ZrF_6$ 3.9; $n_e$ 1.4869; $v_e$ 78.2; $\vartheta'$ 4703; $\Delta v_e$ +7.8.

10. Fluorophosphate glass as claimed in claim 1, the elements of said mixture being in mol percent about $NaPO_3$ between 2.5 and 2.6; $Mg(PO_3)_2$ between 1.6 and 1.7; $Al(PO_3)_3$ between 5.3 and 5.5; $MgF_2$ between 9.7 and 10.0; $CaF_2$ between 39.7 and 41.2; $SrF_2$ between 7.3 and 7.6; $BaF_2$ between 8.8 and 9.2; $AlF_3$ between 21.3 and 21.9; $K_2TiF_6$ between 0.4 and 3.8; $n_e$ between 1.4782 and 1.4843; $\nu_e$ between 75.4 and 82.6; $\mathfrak{S}'$ between 4698 and 4847; $\Delta\nu_e$ between +11.8 and +22.4.

11. Fluorophosphate glass as claimed in claim 1, the elements of said mixture being in mol percent about $LiPO_3$ 3.0; $Mg(PO_3)_2$ 1.7; $Al(PO_3)_3$ 5.5; $MgF_2$ 10.1; $CaF_2$ 41.6; $SrF_2$ 4.4; $BaF_2$ 9.3; $AlF_3$ 22.2; $K_2TiF_6$ 2.2.

12. Fluorophosphate glass as claimed in claim 1, the elements of said mixture being in mol percent about $LiPO_3$ 3.0; $Mg(PO_3)_2$ 1.7; $Al(PO_3)_3$ 5.5; $MgF_2$ 10.1; $CaF_2$ 41.6; $BaF_2$ 9.3; $AlF_3$ 22.2; $KAsO_3$ 6.6.

13. Fluorophosphate glass as claimed in claim 1, the elements of said mixture being in mol percent about $LiPO_3$ 3.1; $Mg(PO_3)_2$ 1.7; $Al(PO_3)_3$ 5.6; $MgF_2$ 10.2; $CaF_2$ 42.0; $SrF_2$ 3.4; $BaF_2$ 9.4; $AlF_3$ 22.3; $K_2ZrF_6$ 2.3.

14. Flourophosphate glass as claimed in claim 1, the elements of said mixture being in mol percent about $LiPO_3$ 3.1; $Mg(PO_3)_2$ 1.7; $Al(PO_3)_3$ 5.7; $MgF_2$ 10.4; $CaF_2$ 42.7; $BaF_2$ 7.1; $AlF_3$ 22.7; $KAsO_3$ 2.7; $K_2ZrF_6$ 3.9.

15. Fluorophosphate glass as claimed in claim 10, said elements being present in the following approximate mol percentages: $NaPO_3$ at 2.5, $Mg(PO_3)_2$ at 1.7, $Al(PO_3)_3$ at 5.5, $MgF_2$ at 10.0, $CaF_2$ at 41.2, $SrF_2$ at 7.6, $BaF_2$ at 9.2, $AlF_3$ at 21.9 and $K_2TiF_6$ at 0.4.

16. Fluorophosphate glass as claimed in claim 10, said elements being present in the following approximate mol percentages: $NaPO_3$ at 2.5, $Mg(PO_3)_2$ at 1.7, $Al(PO_3)_3$ at 5.5, $MgF_2$ at 9.9, $CaF_2$ at 41.0, $SrF_2$ at 7.6, $BaF_2$ at 9.1, $AlF_3$ at 21.9 and $K_2TiF_6$ at 0.8.

17. Fluorophosphate glass as claimed in claim 10, said elements being present in the following approximate mol percentages: $NaPO_3$ at 2.5, $Mg(PO_3)_2$ at 1.7, $Al(PO_3)_3$ at 5.4, $MgF_2$ at 9.9, $CaF_2$ at 40.8, $SrF_2$ at 7.5, $BaF_2$ at 9.1, $AlF_3$ at 21.7 and $K_2TiF_6$ at 1.4.

18. Fluorophosphate glass as claimed in claim 10, said elements being present in the following approximate mol percentages: $NaPO_3$ at 2.5, $Mg(PO_3)_2$ at 1.7, $Al(PO_3)_3$ at 5.4, $MgF_2$ at 9.9, $CaF_2$ at 40.6, $SrF_2$ at 7.4, $BaF_2$ at 9.0, $AlF_3$ at 21.4 and $K_2TiF_6$ at 2.1.

19. Fluorophosphate glass as claimed in claim 10, said elements being present in the following approximate mol percentages: $NaPO_3$ at 2.6, $Mg(PO_3)_2$ at 1.6, $Al(PO_3)_3$ at 5.3, $MgF_2$ at 9.8, $CaF_2$ at 40.0, $SrF_2$ at 7.5, $BaF_2$ at 8.9, $AlF_3$ at 21.3 and $K_2TiF_6$ at 3.0.

20. Fluorophosphate glass as claimed in claim 10, said elements being present in the following approximate mol percentages: $NaPO_3$ at 2.5, $Mg(PO_3)_2$ at 1.6, $Al(PO_3)_3$ at 5.3, $MgF_2$ at 9.7, $CaF_2$ at 39.7, $SrF_2$ at 7.3, $BaF_2$ at 8.8, $AlF_3$ at 21.3 and $K_2TiF_6$ at 3.8.

21. The process of manufacturing fluorophosphate glass having refractive indices of about from 1.47 to about 1.53 and having dispersion values of about from 75 to about 85, comprising the steps of: preparing a well mixed composition of the following materials (a) 9–12 mol percent of the metaphosphates of the elements selected from the group consisting of lithium, sodium, potassium, magnesium, and aluminum;

(b) 81–90 mol percent of fluorides of the elements selected from the group consisting of magnesium, calcium, strontium, barium, and aluminum;

(c) 0.4–7 mol percent of at least one of the compounds selected from the group consisting of potassium arsenate, potassium fluorotitanate, potassium fluorozirconate, and potassium fluorotantalate; and with the proviso that (d) a proportion of aluminum metaphosphate is always present to at least one-half of the phosphate proportion; and (e) the calcium fluoride is always present at about one-half (+ or −10%) and the aluminum fluoride is always present at about one quarter of the proportion of fluoride;

and of melting them down in a crucible at a furnace temperature of about 1000° C., of refining the melt at a temperature of about 1200° C. for about 5 minutes, of cooling down the melt to about 630° C. with constant stirring, of casting the stirred cooled melt into carbon molds preheated to about 440° C. and of annealing the casted glasses.

References Cited

UNITED STATES PATENTS

| 2,430,539 | 11/1947 | Kuan-Han Sun | 106—47 |
| 2,578,325 | 12/1951 | Kuan-Han Sun et al. | 106—47 |
| 2,716,069 | 8/1955 | Pincus | 106—47 |
| 3,068,108 | 12/1962 | Geffcken | 106—47 |

FOREIGN PATENTS

| 781,243 | 8/1957 | Great Britain. |

HELEN M. McCARTHY, Primary Examiner